Figure 1:
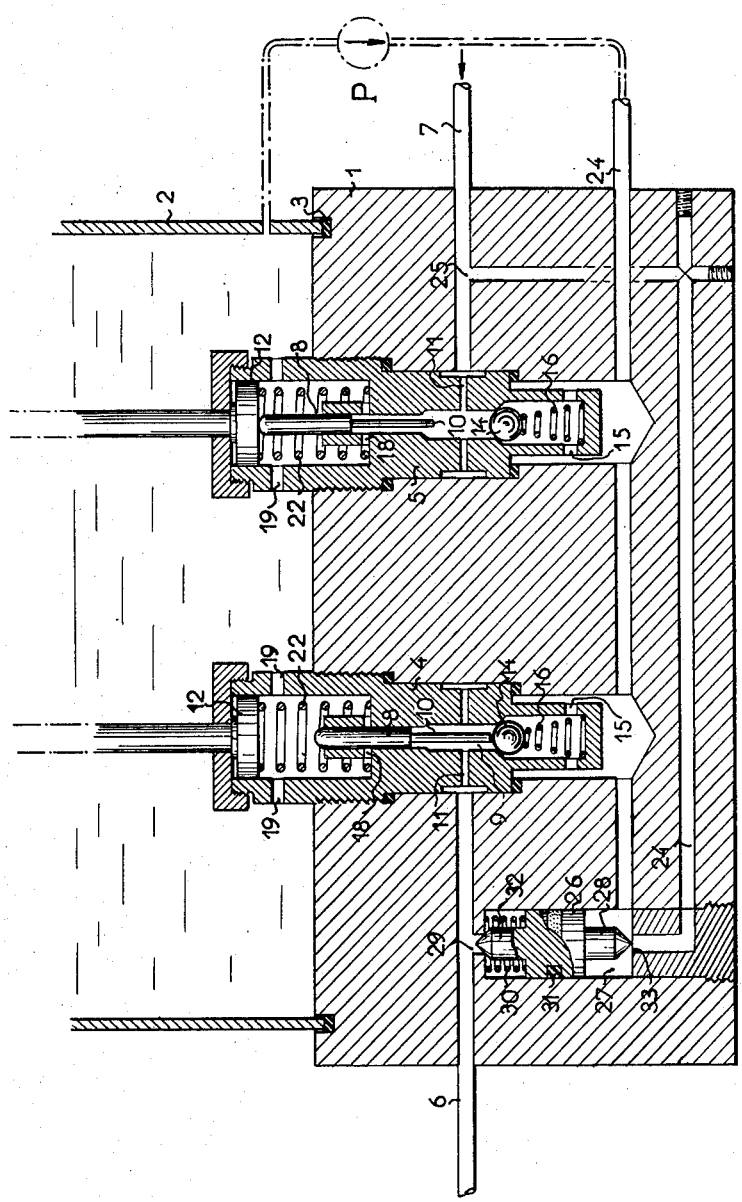

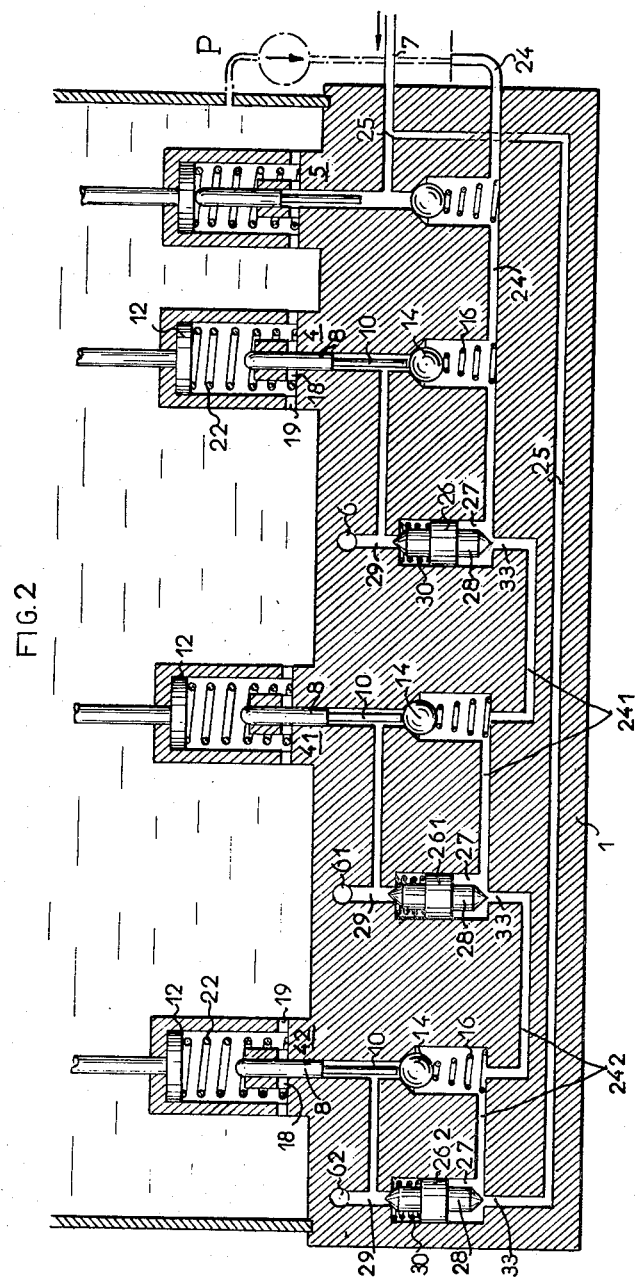

United States Patent Office 2,989,079
Patented June 20, 1961

2,989,079
CONTROL VALVE DEVICES FOR CONNECTING TWO OR MORE HYDRAULIC ACTUATORS SELECTIVELY TO A COMMON CONTINUOUS FEED
Jean Louis Gratzmuller, 30 Avenue Georges Mandel, Paris 16, France
Filed Apr. 8, 1957, Ser. No. 651,199
Claims priority, application France Apr. 11, 1956
9 Claims. (Cl. 137—622)

This invention relates to a control valve device for connecting one or other or more than one of two or more hydraulic actuators to a common supply giving a continuous feed.

The expression hydraulic "actuator" as herein used is to be understood to mean any hydraulic power device, such as a jack or motor, requiring only one service line for feeding it with liquid. Thus a double-acting jack, which requires a separate service line for each of its chambers, must be regarded for the purposes of this invention as two separate actuators.

When an actuator is to be fed from a source of liquid under pressure giving a continuous delivery, such as a pump and hereinafter referred to for convenience as such, it is necessary when the actuator is not energised either to stop the pump or to short-circuit its delivery; and when two or more actuators are to be supplied from the same pump, and may be required to be energised alternately or simultaneously at choice it is evidently inconvenient to have to stop the pump when none of the actuators is energised.

The object of this invention therefore is a control valve device by which the energising of two or more hydraulic actuators from a common feed source giving a continuous delivery, e.g. a pump, may be selectively controlled, and which will automatically ensure the short-circuiting of the pump when none of the actuators is energised.

According to this invention, a control valve device for selectively connecting each of two or more service lines, each serving one or more hydraulic actuators, either to a continuous-delivery source of liquid under pressure, such as a pump, or to a reservoir to receive flow from the valve under residual pressure which may be termed the exhaust from the system. The reservoir, therefore, may also be referred to as an exhaust receiver, comprises independently controllable two-position valves, respectively connected with the several service lines, each such valve being operable to connect its associated service line either with said source or with said reservoir or exhaust receiver, a duct connecting said source with one of said service lines, and an automatic valve, or a cascade of automatic valves in said duct, said automatic valve or valves being so connected with the other or the others of said service lines and being so operative as to obstruct said duct when the other or any one of the others of said service lines are connected with said source through the associated control valve and to leave said duct unobstructed when the other or all the other of said service lines is/are not so connected to said source.

Two embodiments of the invention are illustrated by way of example only in the accompanying drawings, of which, FIGURE 1 is a somewhat schematic sectional view of a first embodiment; and FIGURE 2 is a similar view of a second embodiment.

The device illustrated in FIGURE 1 comprises a solid block 1 which forms the base of a reservoir or exhaust receiver 2, the joint between block 1 and reservoir 2 being sealed by a sealing ring 3. The body has valve pockets receiving the bodies of two similar controllable valves 4, 5, a plugged recess forming a cylindrical chamber 27 containing an automatic valve, and ducts or galleries connecting said pockets and chamber with one another and with external connections to the delivery of a pump P and to two combined feed and exhaust service lines leading to hydraulic actuators (not illustrated), e.g. two single-acting hydraulic jacks with resilient return means (or the two working chambers of one double-acting hydraulic jack). A pump P, for instance, may be provided to supply fluid under pressure. Pump P is shown as taking suction from reservoir or receiver 2 in each of the figures of drawing. Any source of fluid under pressure may, of course, be used.

The pump delivery or other source of fluid under pressure is connected to duct or gallery 24 communicating with the bottoms of the valve pockets and with the lower part of chamber 27, while the two service lines connect respectively with ducts or galleries 6, 7, of which gallery 6 communicates with valve 4 and gallery 7 with valve 5. Gallery 6 also communicates with a port 29 at the top of chamber 27 and gallery 7 with a transfer duct or gallery 25 terminating in a valve-seating port 33 at the bottom of chamber 27.

The valves 4, 5 being precisely similar, a single description will suffice for both. The valve body 4 (or 5) has an axial bore 9 in the lower part of which is a downward facing seating for a ball 14 normally held on its seating by a spring 16. The underside of the ball communicates freely with the pump delivery gallery 24 through openings 15 and the bottom of the valve pocket. Above the ball seating the bore 9 communicates through side portings 11 with the feed and return gallery 6 (or 7). Slidable in bore 9 above the portings 11 is a free plunger 8, which when in the fully raised position (as illustrated for valve 5) exposes side ports 18, through which and through ports 19 in the valve body the bore 9, and hence the gallery 6 (or 7) can communicate with the reservoir 2. The plunger 8 has a downward extension 10 of reduced diameter, which when the plunger 8 is fully depressed unseats the ball 14. A controllable operating plunger 12, normally held in fully raised position by a spring 22, can be depressed, e.g. manually or electrically, to depress plunger 8 fully and thus unseat ball 14 while obstructing the ports 18. When this takes place the hydraulic liquid under pressure flows from gallery 24 through ports 15, bore 9 and the portings 11 to gallery 6, or 7 as the case may be. When the operating plunger 12 is released the pressure in gallery 24 assisted by the spring 16 seats the ball 14 and the residual pressure in gallery 6 (or 7) transmitted through portings 11 and bore 9 raises the plunger 8 so as to uncover the ports 18 and allow the actuator connected to gallery 6 (or 7) to exhaust the liquid it contains through portings 11, bore 9 and ports 18, 19 into the reservoir 2.

Slidable in the chamber 27 is a piston 26 having a lower needle 28 seatable on port 33. Piston 26 is biased by a spring 30 in the direction for seating the needle 28. When pressures on opposed faces of piston 26 are nearly or quite equal spring 30 causes needle 28 to seat and seal gallery 25 from gallery 24, but when the pressure in gallery 24 exceeds that in gallery 6 by a predetermined amount, spring 30, which is suitably calibrated, yields and allows the needle 28 to be unseated. The piston 26 is sealed by a sliding seal 31, but this seal does not need to be very tight to prevent leakage from gallery 24 to gallery 6 when the pressure in the latter is low, since the piston 26 has a second needle 32 which seats on the port 29 when the piston is raised and thus seals chamber 27 from gallery 6.

The complete device operates as follows:

In the absence of any sensible pressure in the pump delivery gallery 24 the spring 30 seats the needle 28 on port 33 thus sealing gallery 25. Any residual pressure in either of galleries 6, 7 will then raise the plunger 8 of valve 4 or 5 and allow such pressure to be relieved by escape of liquid into the reservoir through ports 18, 19. If now the pump is put into action so as to put gallery 24 under pressure, without either plunger 12 being depressed, the pressure in gallery 24 will unseat needle 28 and allow the pumped liquid to pass through gallery 25 into gallery 7 and thence through valve 5 into the reservoir, the plunger 8 of valve 5 being held raised by the flow of liquid through the valve. So long, therefore, as neither of the controllable valves 4, 5 is positively operated to feed the service line it controls the pump delivery is short-circuited and the pump runs under no load.

If now the control plunger 12 of valve 5 is fully depressed, the plunger 8 is thereby depressed to obstruct the ports 18, thus stopping the short-circuiting of the pump delivery, and to unseat the ball 14 so that the pump delivery now feeds the gallery 7 and the service line connected to it directly through gallery 24, ports 15, bore 9 and portings 11.

If, on the other hand, the plunger 12 of valve 4 is similarly depressed to unseat its ball 14, putting gallery 24 into direct communication with gallery 6 the pressure in that gallery is sufficiently raised to enable spring 30 to seat the needle 28 on port 33, thus sealing off the galleries 25 and 7 from the gallery 24 so that the pump delivery ceases to be short-circuited through valve 5; and since there is no longer any flow through that valve to hold up its plunger 8, the latter descends and obstructs the associated ports 18. In this way the pump delivery is directed to gallery 6 and the service line connected to it.

Evidently if both plungers 12 are depressed simultaneously, unseating both balls 14, the ports 18 of both valves 4, 5 are obstructed and the pump delivery is not short-circuited, but directed to both galleries 6, 7 and the service lines connected to them.

The embodiment of the invention above described with reference to FIGURE 1 is one having two control valves controlling two service lines. If three or more service lines to be controlled, the device will include one or more additional valves each associated with an automatic valve.

FIGURE 2 illustrates an embodiment controlling four service lines 6, 61, 62 and 7 respectively controlled by valves 4, 41, 42 and 5, valves 4, 41 and 42 being each associated with an automatic valve 26, 261, 262 respectively. Each such automatic valve is connected, via a port 29, with the service gallery 6, 61 or 62 of its associated control valve, and the several automatic valves being connected in series between the pump delivery gallery 24 and the transfer gallery 25, i.e. the port 33 of the first automatic valve 26, whose chamber 27 is connected to a gallery 24 is connected by an intermediate transfer duct or gallery 241 to the chamber 27 of the next automatic valve 261 of the series, whose port 33 is connected by a transfer duct or gallery 242 to the chamber 27 of valve 262, the port 33 of the last automatic valve 262 of the series being connected to the transfer gallery 25. Thereby, if any one of the valve needles 28 is seated on its corresponding port 33, by subjection of the associated service gallery, such as 6, 61 or 62 to sufficient pressure, the transfer gallery 25 will be sealed off from the delivery gallery 24 and thus stop the short-circuiting of the pump delivery.

What is claimed is:

1. A control valve device for connecting each of a plurality of service lines, each serving at least one hydraulic actuator selectively, to a continuous-delivery source of liquid under pressure or to a reservoir, said valve device comprising independently controllable two-position valves, respectively connected with the service lines, each said valve being operable to connect its associated service line either with said source or with said reservoir, a duct connecting said source of liquid under pressure with one of said service lines, and at least one automatic valve, in said duct, said automatic valve being connected with the other of said service lines and being operative so as to obstruct said duct when said other service line is connected with said source of liquid under pressure through the associated two position valve and to leave said duct unobstructed when said one service line is connected to said source through its associated two-position valve.

2. A control valve device for connecting each of two service lines, each said line serving at least one hydraulic actuator, selectively to a continuous-delivery source of liquid under pressure, or to a reservoir, said valve device comprising two independently controllable two-position valves, connected respectively with the two service lines, each said valve being operable to connect its associated service line either with said source or with said reservoir, a duct connecting said source with the other of said service lines, and an automatic valve in said duct responsive to the difference between the pressure in one of said service lines and the pressure of said source for normally obstructing said duct when the first mentioned service line is connected by its associated control valve to said source.

3. A control valve device for connecting each of a plurality of service lines, each serving at least one hydraulic actuator, selectively to a continuous-delivery source of liquid under pressure, or to a reservoir, said valve device comprising independently controllable two-position valve elements connected respectively with the several service lines and each said valve elements being operable to connect its associated service line selectively with said source or with said reservoir, a continuous duct interconnecting said source with one of said service lines, and a plurality of automatic valves each associated with the other said service lines, said automatic valves being disposed in series in said duct, and each said automatic valve being operative responsively to the difference between the pressure in its associated service line and the pressure in that part of said duct in which it is situated, to obstruct said duct when its associated service line is connected by the associated control valve to said source.

4. A control valve device as claimed in claim 2, in which the automatic valve comprises a piston carrying on one face a valve needle seatable on a seating in said duct, its other face being subjected to the pressure in the associated service line and loaded by a spring.

5. A control valve device as claimed in claim 4, in which said piston carries a second valve needle, which, when the first mentioned needle is unseated, seats on a port communicating with the associated service line.

6. A constructional form of control valve device as claimed in claim 3, in which the several control and automatic valves are mounted in a single solid block forming the base of the reservoir.

7. A control valve system for a fluid power transmission including a source of fluid under pressure, a first fluid pressure line, a second fluid pressure line, and a reservoir, said valve system comprising a first selector valve operable to selectively connect said first pressure line to either said source or to said reservoir, a second selector valve operable to selectively connect said second pressure line to either said source or to said reservoir, a by-passing valve for connecting said source with said first pressure line, means subject to the fluid pressure delivered by said source for causing operation of the by-passing valve, and means effective for causing the by-passing valve to close when said second selector valve interconnects said source with said second pressure line.

8. A control valve system for a fluid power transmission including a source of fluid under pressure, a plurality of fluid pressure lines, and a reservoir, said valve system comprising a plurality of selector valves one of which is operable to selectively connect a first one of said pressure lines to either said source or to said reservoir, the other selector valves being each operable to connect one of the the other pressure lines, respectively, to either said source or to said reservoir, pressure fluid conducting means interconnecting said source and said first pressure line, a plurality of by-passing valves in said fluid conducting means, one by-passing valve for each of said other selector valves, means subject to the fluid pressure in said conducting means for causing operation of each by-passing valve, and means responsive to fluid pressure in said other pressure lines for causing at least one of said by-passing valves to close when one of said other selector valves connects its associated pressure line with the source.

9. A control valve system for a fluid power transmission system of the including a source of fluid pressure, two fluid pressure lines, and a reservoir, a control valve assembly comprising a first selector valve and a second selector valve, each selector valve including a valve chamber having a fluid inlet port adapted to be connected with said source, a fluid exhaust port adapted to be connected with said reservoir, and an operating port intermediate said inlet port and said exhaust port adapted to be connected with one of said pressure lines, respectively, a valve seat disposed toward said inlet port, a check valve cooperating with said seat, a movable valve means arranged in the chamber to occupy one position in which it connects the operating port with the exhaust port and another position in which it closes the exhaust port and opens said check valve to thereby connect the operating port with the inlet port, said valve means being adapted to be actuated by fluid pressure in the chamber to occupy said one position, and valve actuating means arranged to move said valve means to said other position, a by-passing fluid conducting means extending from the inlet of said second selector valve to the pressure line communicating with the operating port of said first selector valve, and a spring loaded reciprocable by-passing valve of the piston type having two pressure faces of substantially equal area, one of said pressure faces being exposed to fluid pressure in said fluid conducting means to urge the by-passing valve towards open position against the action of the spring, and the other pressure face being exposed to fluid pressure in the fluid pressure line communicating with the operating port of said second selector valve to urge said by-passing valve towards closed position in conjunction with the action of said spring.

References Cited in the file of this patent
UNITED STATES PATENTS

| | | |
|---|---|---|
| 2,069,366 | Heerdt | Feb. 2, 1937 |
| 2,359,802 | Stephens | Oct. 10, 1944 |
| 2,392,421 | Stephens | Jan. 8, 1946 |
| 2,420,554 | Mott | May 13, 1947 |
| 2,517,406 | Mott | Aug. 1, 1950 |
| 2,729,233 | Garmager | Jan. 3, 1956 |